G. W. TINGLE.
STORM FRONT FOR VEHICLES.
APPLICATION FILED MAR. 28, 1910.
1,035,271.
Patented Aug. 13, 1912.
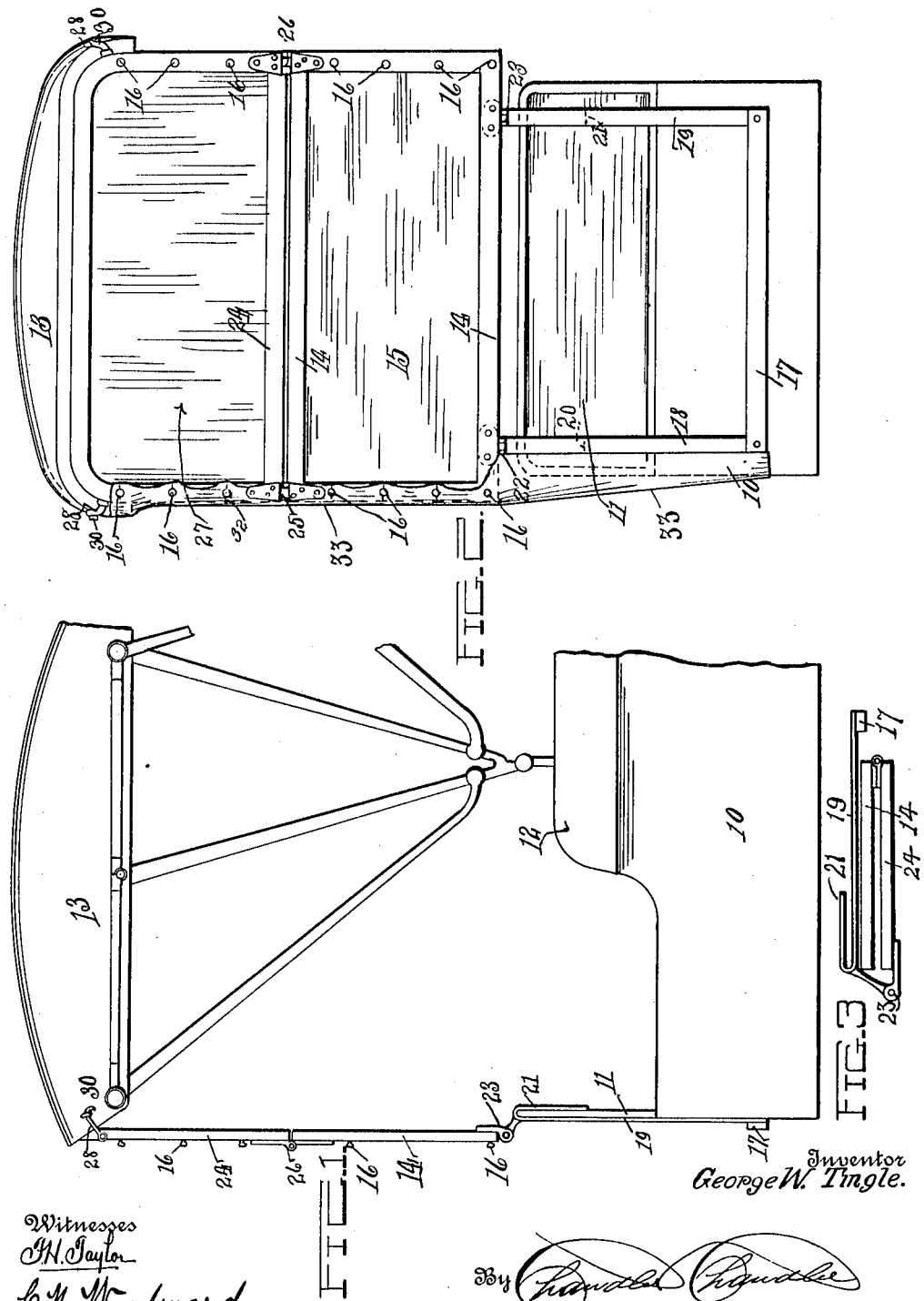
Witnesses
J. H. Taylor
C. N. Woodward
Inventor
George W. Tingle.
By [signature]
Attorneys

UNITED STATES PATENT OFFICE.

GEORGE W. TINGLE, OF CHATHAM, OHIO.

STORM-FRONT FOR VEHICLES.

1,035,271.  Specification of Letters Patent.  Patented Aug. 13, 1912.

Application filed March 28, 1910. Serial No. 551,935.

*To all whom it may concern:*

Be it known that I, GEORGE W. TINGLE, a citizen of the United States, residing at Chatham, in the county of Medina, State of Ohio, have invented certain new and useful Improvements in Storm-Fronts for Vehicles; and I do hereby declare the following to be a full, clear, and exact description of the invention, such as will enable others skilled in the art to which it appertains to make and use the same.

This invention relates to storm fronts for vehicles, and has for one of its objects to provide a simply constructed device which may be readily adapted without material structural changes to vehicles of various forms and to vehicles having various forms and arrangements of tops, either foldable or stationary, and which may also be applied to automobiles and like vehicles.

Another object of the invention is to provide a device of this character having portions foldable to enable them to be opened when required.

With these and other objects in view, the invention consists in certain novel features of construction as hereinafter shown and described and then specifically pointed out in the claim.

The improved device, as before stated, may be applied to vehicles of various forms and constructions, and it is not desired therefore to limit the invention to vehicles of any particular construction, but for the purpose of illustration the device is shown applied to a conventional buggy having a foldable top, and in the drawings employed to illustrate the embodiment of the invention, Figure 1 is a side view of a portion of a buggy body and foldable top with the improvement applied. Fig. 2 is a front elevation of the parts shown in Fig. 1, with the curtain removed from one side. Fig. 3 is a view of the improved device detached and in folded position, showing the movable connected parts in a modified form.

The improved device comprises in general a front portion formed in two sections, a lower section hingedly connected to the upper portion of the dash board, and an upper section hingedly united to the lower section, the lower section being preferably covered with oil cloth or like material and the upper section being provided with a transparent material such as glass, transparent celluloid or the like. The lower section of the front is coupled to the dash board by a detachable clamp device, so that the entire front may be readily removed from or attached to the dash board. The buggy body is represented as a whole at 10 with the dash board at 11, the seat at 12 and the foldable top at 13, these parts being of the usual construction.

The lower front section is represented as a whole at 14 and is preferably a rectangular frame of any suitable material, but preferably of wood as light as possible consistent with the strains to which it will be subjected and covered with oil cloth or like fabric indicated at 15. The frame 14 is also provided with numerous buttons 16 spaced apart to receive the side curtains, as hereinafter explained.

The frame 14 is hingedly coupled to the dash board by a suitable clamp device, the latter consisting of a transverse base member 17 and vertical members 18—19 rising from its ends. The vertical members 18—19 are provided at their upper ends respectively with relatively long hooks 20—21 which bear over the upper edge of the dash board 11 and by means of which the member 17 is coupled to the dash board.

As clearly shown in the drawings the frame 14 extends a suitable distance below the lower engaging hooks 20 and 21, whereby the front is removably and properly supported in a perpendicular position when attached to the vehicle body, the supporting frame thus constructed being very durable and can be conveniently attached to the dash board and alining front wall of the body of the vehicle without the employment of fastening devices.

The lower front section 14 is hingedly united at 22—23 to the members 18—19, as shown. The upper front section is formed of a rectangular frame 24 similar to the frame 14 and hingedly united thereto at 25—26. The frame 24 is designed to support a transparent body 27, which may be of glass, transparent celluloid or like material. The frame 24 is provided with a plurality of the curtain supporting buttons 16, as shown. The frame 24 is also provided with hooks 28 to enable the "front" to be detachably coupled to the buggy top 13, the latter being provided with eyes 30 to receive the hooks, as shown.

Suitable side curtains, one of which is shown at 33, are employed, the curtains having suitable eyelets 32 to engage over the buttons 16 and likewise to engage over suitable buttons connected at suitable points upon the buggy top. The side curtains will be formed to correspond to the shape of the buggy top and of the body, and will vary to fit buggies of different shapes and sizes.

The material composing the curtains 30 and the cover 15 of the frame 14 will correspond in texture and appearance with the fabric portion of the buggy top, so that the device when attached will not detract from the appearance of the buggy.

The improved device is simple in construction, can be inexpensively manufactured and applied, and may be folded into a small space when not in use. To this end the frame members 14—24 are foldable one upon the other by the hinges 25—26, and the clamp members 18—19 together with the base 17 are foldable upon the folded frame members so that the improved device together with the folded side curtains may be placed beneath the seat of the buggy or otherwise disposed of when not in use. The improved device will preferably be carried beneath the seat of the buggy in good weather, and in event of a storm arising may be very quickly connected to the buggy.

By this simple means an ordinary open buggy may be quickly transformed into a closed buggy without modifying or changing any of the parts of the vehicle.

What is claimed is:—

In a device of the class described, the combination with a dashboard and top of a vehicle, of upper and lower hingedly connected frame sections, a supporting frame consisting of a horizontal base member and vertical members, hooks formed integral with the vertical members, the lower frame section being hingedly connected in advance of said vertical members, said supporting frame being adapted to clamp upon the dashboard, eyes secured to the vehicle top, hooks pivotally connected to the upper frame section and adapted to engage with said eyes whereby the sections are held in their unfolded and operative position, and means carried by each frame section for detachably securing the side curtains of the vehicle.

In testimony whereof, I affix my signature, in presence of two witnesses.

GEORGE W. TINGLE.

Witnesses:
D. B. WEISE,
THOMAS H. BROWN.

---

Copies of this patent may be obtained for five cents each, by addressing the " Commissioner of Patents, Washington, D. C."